May 15, 1934.  O. U. ZERK  1,959,259
SEALING MEANS FOR OSCILLATING MEMBERS
Filed May 4, 1932  2 Sheets—Sheet 2
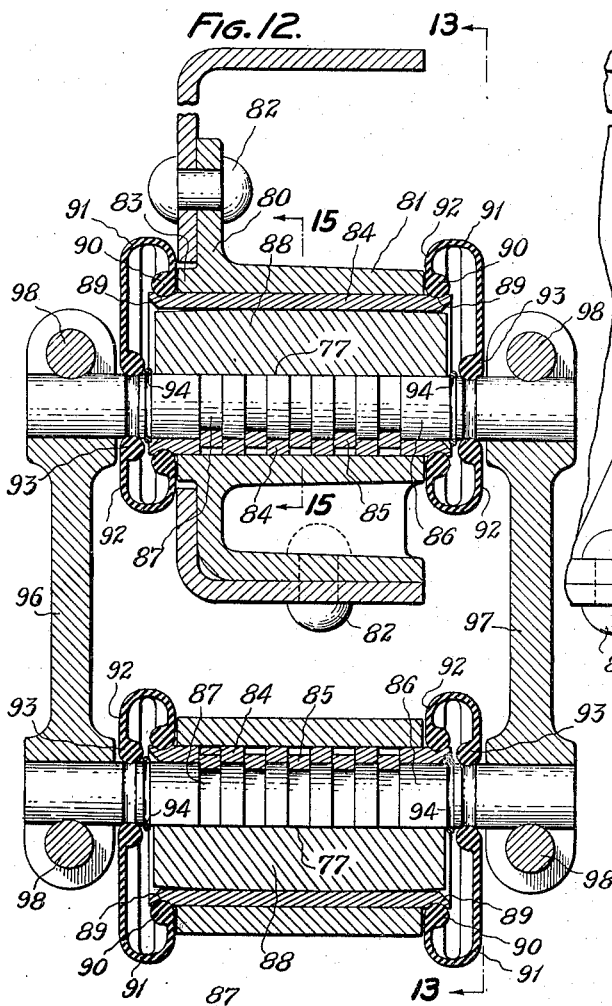
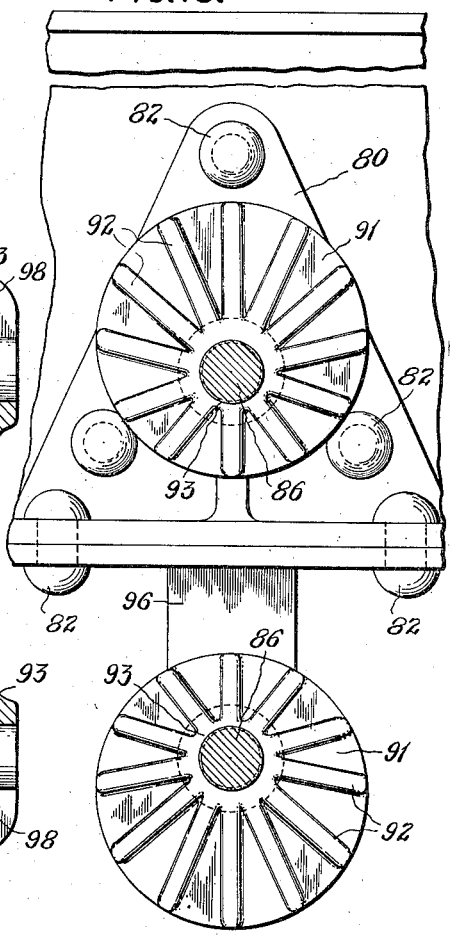
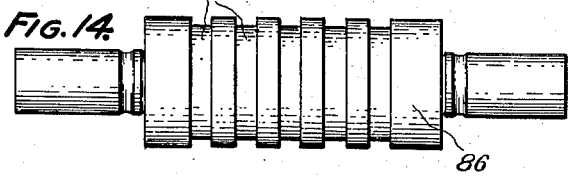
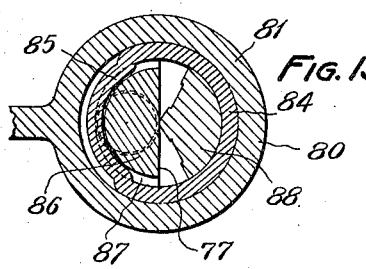
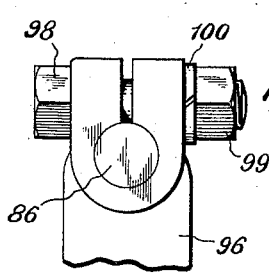
INVENTOR.
Oscar U. Zerk
BY
Slough + Canfield
ATTORNEYS.

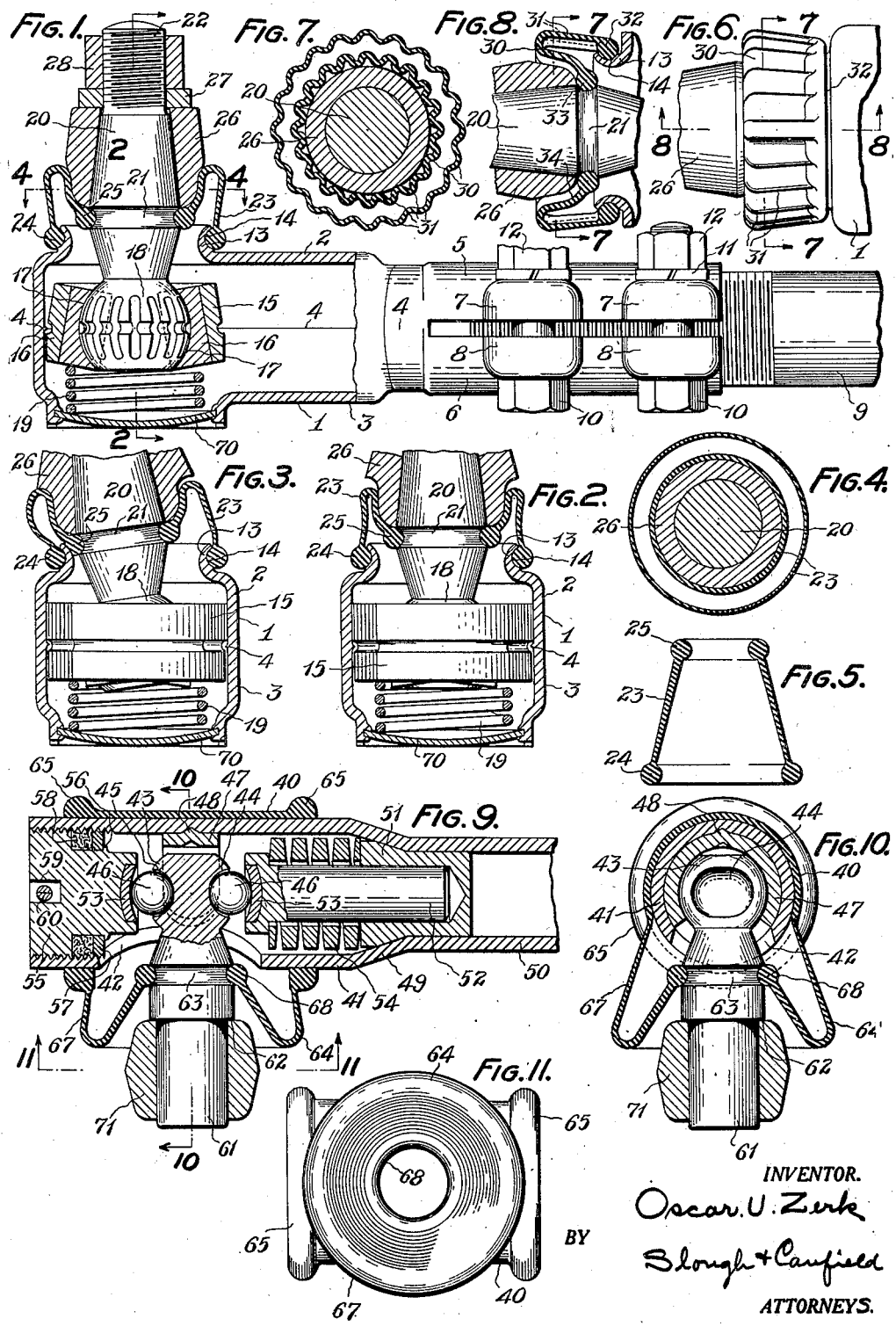

UNITED STATES PATENT OFFICE 1,959,259

SEALING MEANS FOR OSCILLATING MEMBERS

Oscar U. Zerk, Chicago, Ill.

Application May 4, 1932, Serial No. 609,176

5 Claims. (Cl. 287—90)

My invention relates to an improved sealing means for bearings generally and for oscillating or rocking bearings in particular, and is adaptable to any type of joints linking relatively oscillatory members. It has peculiar adaption to tie rod or drag link joints, foot pedal joints, spring shackle and spring hanger joints and kindred types of oscillating joints.

Heretofore the sealing means employed in connection with this type bearing has usually comprised packing which is movable relative to one of the two bearing members or their respective housings, thus creating friction and wear. Packing means of this type have the further disadvantage that the continuous movement of the packing elements against one of the bearing members will ultimately result in an ineffective seal. This is caused by the very gradual but continuous rubbing of the packing elements against the bearing members or housing.

An effective seal adapted to have a relatively long life can only be effected by eliminating all and every movement between the closure member adapted to seal the bearing or joint and any member or members connected with these bearings. I accomplish this result by using a continuous flexible cover having two open ends, one end being adapted to sealingly and constrictingly engage one of the bearing elements in non-slipping relationship and the other end being adapted to sealingly and constrictingly engage the other bearing member or housing in non-slipping relationship therewith.

I am familiar with flexible closure elements such as canvas or fabric adapted to be secured to the bearing members by mechanical means such as wires, clamps and springs. Rubber, which in addition to being flexible is also resilient has not been successfully employed heretofore for the purpose of sealing bearing members.

I contemplate employing a flexible preferably rubber-like closure member in connection with a bearing which can be initially filled with lubricant and effectively sealed so that the lubricant will last the entire life of the bearing and will not require periodic replacement. Heretofore, it was generally desired that contaminated old lubricant be permitted to escape from the bearing whenever new lubricant was forced into the bearing at relatively frequent intervals.

The flexible covers used at the present time are adapted primarily to prevent the ingress of foreign substances to the bearing chamber and since bearings are generally lubricated by a high pressure system, the covers necessarily could not be connected to the bearing members in lubricant-tight relation as otherwise they would be forced open when subjected to the pressure necessary to force the lubricant into the bearing or bearing chamber. Furthermore, I contemplate a type of bearing employing a very viscous lubricant, such as high viscosity oil. By high viscosity oil I mean oil having a viscosity of from 3000 to 4000 at 100 degrees.

Natural rubber has not heretofore been employed for this purpose due to the fact that it is easily deteriorated when subjected to the action of mineral and vegetable oils and greases formed from these oils.

I preferably use a recently discovered type of synthetic rubber, known as chloroprene rubber and having various characteristics and properties not found in natural rubber. It is formed by polymerization of chloroprene or chloro-2-butadrene.

Chloroprene rubber is considerably more resistant to oxidation than natural rubber with the result that it is relatively less subject to deterioration and is also relatively more resistant to the action of solvents and various chemicals than natural rubber. For example, in contrast to natural rubber, chloroprene rubber is not attacked by hydrogen chloride, hydrogen fluoride, sulfuric chlorides, ozone and other chemicals. The high chlorine content of chloroprene rubber renders it very resistant to combustion and the absence of water soluble ingredients therein renders it relatively impervious to penetration by water.

As compared to natural rubber the tendency of this material to absorb gasoline or lubricating oils is relatively slight and consequently a relatively thin closure member formed of synthetic rubber will resist the action of lubricating oils or greases during substantially the entire life of an automobile or machine on which the bearing is employed.

The fact that a relatively thin closure member may be employed permits an extreme flexibility thereby affording a relatively large twisting movement thereof without injury. Also, since the closure member is possessed of extreme flexibility there is relatively little tendency to cause slippage on the element which it constrictingly engages.

Therefore, the principal object of my invention is to provide a resilient sealing member adapted to effectively seal a bearing or the like.

Another object of my invention is to provide a resilient sealing member adapted to constrictingly engage two relatively oscillatory members in fixed relation.

Another object of my invention is to provide an improved sealing member which is relatively thin possessed of extreme flexibility.

Another object of my invention is to provide an improved resilient sealing member wherein the inherent resiliency thereof is employed to secure it to the sealed element.

Another object of my invention is to provide an improved resilient sealing element for bearings or the like which is relatively resistant to deterioration due to oxidation and combustion.

Another object of my invention is to provide an improved resilient closure element for bearings or the like which is relatively resistant to deterioration by gasoline and oils.

Another object of my invention is to provide an improved resilient closure member for bearings or the like possessing extreme flexibility due to the form and inherent resiliency of the element.

Other objects of my invention and the invention itself will become more apparent to those skilled in the art to which my invention appertains from consideration of the following description and drawings in which like references refer to like parts and in which, Fig. 1 is a view partially in section and partially in elevation of a universal joint embodying my invention;

Fig. 2 is a section taken along the line 2—2 of Fig. 1;

Fig. 3 is a view of the embodiment illustrated in Figs. 1 and 2 showing the ball element of a universal joint in an inclined position;

Fig. 4 is a section taken along the line 4—4 of Fig. 1;

Fig. 5 is a vertical cross sectional view of the closure element illustrated in Figs. 1 to 4 prior to engaging the joint elements.

Fig. 6 is a fragmentary elevational view of a modification of my invention;

Fig. 7 is a sectional view taken along the line 7—7 of Fig. 6;

Fig. 8 is a transverse sectional view taken along the line 8—8 of Fig. 6;

Fig. 9 is a vertical medial sectional view through a universal joint having associated therewith another modification of my invention;

Fig. 10 is a transverse sectional view taken along the line 10—10 of Fig. 9;

Fig. 11 is a view of the modification of my invention illustrated in Figs. 9 and 10 taken from plane 11 of Fig. 9;

Fig. 12 is a medial vertical sectional view of a shackle wherein another modification of my invention is employed;

Fig. 13 is a transverse sectional view taken along the lines 13—13 of Fig. 12;

Fig. 14 is a plan view of a member which I may employ in connection with the shackle illustrated in Figs. 12 and 13;

Fig. 15 is a section taken along the line 15—15 or 15'—15' of Fig. 12;

Fig. 16 is an end elevational view of a portion of the shackle illustrated in Figs. 12 and 13; and Fig. 17 is an elevational view of a spring which I may employ in connection with my invention.

Referring to Figs. 1 to 5 of the drawings, a ball joint housing generally indicated at 1 comprises generally similar complementary cup-shaped sections 2 and 3 preferably formed of sheet metal and weldingly secured together along their abutting edges as indicated at 4. The sections 2 and 3 have formed integral therewith generally semi-cylindrical interiorly threaded clamping jaws 5 and 6 provided with apertured aligned lugs 7 and 8 and slotted longitudinally whereby a tie rod or the like 9, may be rigidly and adjustably secured within the clamping jaws 5 and 6 by bolts 10 disposed within the lugs 7 and 8 and locked therein by a lock washer 11 and nut 12.

The upper section 2 is flared outwardly along a perforated portion therein to provide a circular collar 13 provided with an externally preferably semi-cylindrical groove 14 extending therearound.

Prior to butt-welding the sections 2 and 3 together a joint supporting ring 15 is weldingly secured to the lower section 3 and preferably does not contact the upper section thus eliminating any tendency toward short-circuiting during the welding process. The inner walls of ring 15 comprise oppositely disposed V-shaped portions adapted to act as guideways for ball engaging shoes 16 and intermediate arcuate portions. The shoes 16 have the outer faces in the form of a V to conform to the engaging faces of ring 15 and the inner faces are recessed as indicated at 17 concentric with a ball 18 comprising the ball element of a ball and socket joint. The shoes 16 are resiliently supported and held in engagement with the ball 18 by a spring 19 which seats upon an outwardly dished plate 70 secured in a generally circular shoulder of lower section 3, preferably by flanging over spaced peripheral portions of the collar to form a tongue and groove connection.

The spring 19 will thus tend to be self-centering upon the plate 70 and performs a function of keeping the shoes 16 in engaged relation with the ball 18 as wear occurs therebetween. The ball element 18 is provided with a shank 20 comprising a portion progressively increasing in diameter from the ball to a circular groove 21, thence progressively decreasing in diameter to a reduced threaded end 22.

A closure member 23 normally of frusto-conical form is provided with a ring 24 generally circular in cross section at one end thereof which is adapted to constrictingly engage the collar 13 when seated within groove 14 therein. A ring 25 at the opposite end of the closure member 23 is also generally circular in cross section and adapted to constrictingly engage the shank 20 at the groove 21 provided therein, the closure member 23 being doubled back on itself so that the ring 25 forms the end of a re-entrant portion thereof.

The closure member 23 is formed of a resilient material preferably synthetic rubber because of the advantages heretofore described and constrictingly engages both the housing and the shank 20 permitting relative movement therebetween without any movement individually relative to the closure member 23. Thus, there is no tendency for wear due to movement of the rings 24 and 25 with the elements which they encircle. The portion of the closure element 23 intermediate the rings 24 and 25 is made relatively thin and preferably increases in thickness from ring 24 to ring 25 as shown in Fig. 5 whereby when ring 25 is re-entrantly disposed within side walls thereof, the resistance to torsional effects of the inner and outer wall portions will be substantially equal.

An eye 26 of a pitman arm or the like is telescoped over shank 20 and is secured thereto by a washer 27 and a nut 28. The eye 26 preferably being provided with a shoulder against which closure element 23 abuts.

The closure element 23 thus provides an effective seal against the ingress of foreign substances in the bearing element and if it is desirable to fill the chamber externally of the bearing element formed by the sections 2 and 3 with lubricating grease, the grease will be effectively retained within the chamber for an indefinite period. As previously pointed out, chloroprene rubber which I prefer to use is practically impervious to penetration by water, greatly resistant to the ordinarily deteriorating effects of gasoline or oils, and highly resistant to oxidation and combustion. Thus, the life of the closure member 23 will be relatively long and the inherent resiliency therein will not be appreciably diminished.

Fig. 3 illustrates the manner in which the element 23 is flexed as the ball member of the joint is inclined with the vertical.

Referring to Figs. 6, 7 and 8, I have shown a modification of my invention as adapted to a universal joint previously illustrated in connection with Figs. 1 to 5 but wherein the closure element 30 is provided with folds or corrugations 31. In this modification the closure element 30 is provided with a ring 32 at one end thereof generally circular in cross section which constrictingly engages the collar 13 at groove 14 therein and a ring 33 generally circular in cross section at the end of a re-entrant portion 34 of the closure element 31. The ring 33 constrictingly engages the shank 20 at the groove 21 provided therein as previously described. By providing corrugations 31 in element 30 the bearing and housing elements which the element 31 seals may be twisted to a relatively large degree without subjecting the closure element to any appreciable tensional stress. Inasmuch as the resiliency of the closure element 30 is effected by the tensional stress to which it is subjected, it is apparent that such a structure will have a relatively long life or permit of relatively greater movement between the associated parts of a bearing.

In Figs 9, 10 and 11, I have illustrated another modification of my invention wherein a closure element generally indicated at 40 is applied to a universal joint provided with a generally cylindrical housing 41. The housing 41 is apertured as indicated at 42 and has a shank of a ball element 43 projected therethrough. The ball of the ball element 43 is provided with oppositely disposed raceways 44 and 45 adapted to rollingly engage balls 46. The ball element is prevented from lateral movement by a generally U-shaped saddle 47 which engages the sides of the ball and pivotally engages the housing by means of a conical projection 48 seating in a complementary shaped depression in the housing. The inner portion of the housing is flared downwardly to form a shoulder 49 and a reduced tubular portion 50.

A recessed plug 51 is sealingly secured within the tubular portion 50 and abuts the shoulder 49, the recess therein acting as a guideway for a headed pin 52. The head portion of pin 52 has inserted therein a hardened steel plate 53 adapted to rollingly engage ball 46 and dished concentric with the ball of element 43. A relatively stiff spring 54 encircles pin 52 one end of which seats upon a face of plug 51 and the opposite end engages the headed portion of pin 52 thereby holding the pin in spring-pressed relation with ball 46. The opposite ball 46 disposed in raceway 45 seats upon a like plate 53 inserted in a plug 55 which threadedly engages the outer end of housing 41. The portion of plug 55 within which the plate 53 is inserted is relatively reduced and has formed thereon a circular ridge 56 adapted to abut a ring 57 which also threadedly engages the inner portion of housing 41.

A sealing ring 58 composed of suitable packing material is compressively held intermediate plug 55 and the ring 57 thus ensuring a tight seal at the housing end. The plug 55 is preferably slotted as indicated at 59 and provided with a cotter key 60 whereby it may be locked in the adjusted position.

The shank of ball element 43 comprises a portion progressively increasing in diameter from the ball to a circular groove 63, thence a portion of constant diameter terminating in a reduced end 61 forming therebetween a shoulder 62.

A resilient closure element 64 comprises a generally cylindrical portion coaxial with the housing and an integral generally frusto-conical portion 67 before application to the housing which is substantially coaxial with ball element 43. The closure element 64 is provided with relatively thickened ends 65 generally semi-circular in cross section and is telescoped over and constrictingly engages the housing 41, and ends 65 sealingly gripping the portions of the housing which they encircle. The portion 67 of the closure element 64 is provided with a ring 68 at the end thereof, generally circular in cross section which constrictingly engages the shank of ball element 43 at groove 63 therein thus giving the portion 67 a re-entrant form.

The bearing elements are thus surrounded by a chamber which is effectively sealed against the ingress of foreign substances, and a relatively large universal movement may be effected between the bearing elements without altering the effectiveness of the seal provided by closure element 64. Although I do not contemplate that it is necessary to use lubricant with this type bearing an initial filling of lubricant would be retained for an indefinite time and increase the life of the machine to which the universal joint is adapted.

The reduced end 61 of the ball element shank has an eye 71 of a connecting element secured thereto preferably by press-fitting whereby movement may be transmitted to or received from the joint.

Referring to Figs. 12 to 17, I have illustrated another modification of my invention as applied to a knife edge type shackle more specifically shown and described in my co-pending application, Serial No. 604,777, filed April 12, 1932, although it is understood that it has equal application to various types of hanger or shackle and the like constructions. In this modification a generally triangular shaped hanger 80 provided with a hub 81 is rigidly secured to the chassis frame of a vehicle preferably by rivets 82, the frame member being perforated to permit a rearwardly extending portion 83 of the hub to be projected therethrough. The hub 81 has secured therein preferably by press-fitting a bushing 84 having spaced portions thereof pressed outwardly to form a plurality of transversely extending ridges 85. A generally semi-cylindrical bolt 86 having co-axial cylindrical ends disposed eccentric of the semi-cylindrical portion has transverse grooves 87 formed therein adapted to receive the ridges 85 of bushings 84 which forms a seat for the bolt. Sufficient clearance is provided between the inner engaging portions of the bushing and the bolt to restrain lateral movement therebetween but permitting a limited longitudinal rocking of the bolt relative to the bushing. The semi-cylindrical portion of the bolt 86 thus provides a suitably hardened bearing surface 77 which engages a knife edge segment 88 substantially axially thereof. As is clearly illustrated in Fig. 15 the knife edge segment 88 is movable relative to the bolt 86 and also to the bushing 84. The knife edge segment 88 as is illustrated in Fig. 12 is curved longitudinally, thereby permitting a rocking action axially of the bushing. Thus, a limited universal movement may be effected between the bushing and the bolt.

Adjacent the ends of bushing 84 it is grooved as indicated at 89 to provide an engaging surface for a ring 90 of a closure element 91.

The closure element 91 is preferably formed of chloroprene rubber having corrugations 92 therein and is preferably circular in form with parallel corrugated faces. A relatively small ring 93 is integral with the outer face of the element 91 and is eccentrically disposed relative to ring 90 integral with the inner face of element 91.

The cylindrical ends of the bolt 86 are provided with spaced parallel grooves one of which is adapted to provide a surface constrictingly gripped by ring 93 of closure element 91. The second groove has inserted therein a circular spring 94 which is sprung in place and possessing sufficient tension to ensure that it will remain in fixed relation with the cylindrical ends of bolt 86. The function of these springs 94, one of which is placed at either end of the knife edge segment 88 is to restrain the knife edge section 88 from moving axially of bolt 86 which might result from sidesway encountered on a vehicle to which the shackle was affixed. Outwardly of the closure element 91 the cylindrical ends of the pin 83 have secured thereto shackle links 96 and 97 by bolts 98 disposed in aligned apertures provided in bifurcated ends of the shackle and clampingly secured by nuts 99 and lock washers 100. The cylindrical end of the bolt 83 is preferably provided with a transverse recess adapted to engage a portion of bolt 98 and thereby restrain movement of shackle links 96 and 97 axially of the pin 86. The lower portion of the shackle links engage a bolt 86 previously described seated within a bushing 84 in a manner also previously described.

The bushing 84 is tightly secured within the eye of a spring or the like preferably by pressing therein to ensure that there will be no relative lateral movement therebetween.

Otherwise, the construction is generally similar to that described in connection with the hanger bearing other than that the knife edge segment 88 is disposed at the underside of bolts 86 rather than above as in the hanger construction. Inasmuch as in the shackle shown the shackle links are always under compression, it is desirable that both at the hanger and spring end of the shackle the knife edge segment be disposed outwardly of the bolts 86 upon which they rock.

The corrugations 92 in the closure member 91 permit of a relatively great twisting motion to be imparted thereto before the resilient closure element will be subjected to any appreciable tensional stresses. I preferably have the ring 90 which constrictingly engages the bushing end and the ring 93 which constrictingly engages the cylindrical bolt end disposed in adjacent parallel planes thereby ensuring that the closure element 91 will be subjected to a minimum of torsional stress. I also prefer that the shackle links 96 and 97 be placed outwardly of the closure element 91 so that if it is desired to use lubricant in connection with the knife edge bearing that it will be effectively trapped intermediate the closure element 91 and will not be permitted to seep along the shaft and escape through the apertures provided for bolts 98. The knife edge bearing elements are thus effectively sealed against the ingress of foreign substances by closure elements which are relatively thin and possessed of extreme flexibility and which normally will outline the shackle on which they are employed.

Although I have shown the closure elements 91 as being provided with eccentrically spaced rings 90 and 93 it is understood that this was adapted to the specific construction shown and I contemplate that a similar design employing concentrically spaced ring may be utilized.

Although I have shown and described embodiments of my invention, I contemplate that numerous and extensive departures therefrom may be made without departing from the spirit and scope of my invention and the appended claims.

Having thus described my invention, what I claim is:

1. A rubber or like closure member generally frusto-conical shaped and adapted to have one end thereof reentrantly contained within the side walls of the other end the frusto-conical wall being of varying thickness whereby the reentrantly contained end may have torsional movement relative to the other end with substantially equal wall resistance to torsion.

2. A tubular rubber-like closure element generally frusto-conical in shape and having walls progressively increasing in thickness from its larger end to its smaller end.

3. A rubber or like closure member adapted to sealingly engage a male bearing member and a female bearing member, comprising spaced relatively thickened rings each adapted to constrictingly engage a different one of the said bearing members or associated parts and integrally secured together by a relatively thin resilient wall of varying thickness whereby it is substantially uniformly resistant to torsional movement.

4. A resilient hollow closure member for bearings and the like having a pair of wall perforations peripherally relatively thickened, formed of chloroprene rubber and adapted to engage the bearing elements, and an integral intermediate wall portion formed of natural rubber whereby lubricant may be retained in the hollow closure member and moved with a pumping action therein by contracting and expanding movements of the closure member upon relative movement of the bearing elements.

5. A sealing element for sealing relatively oscillatory mechanism members, comprising a tubular rubber or like closure portion provided with relatively thickened end portions of unequal diameter, each of said end portions being adapted to extend into a channel encircling one of the two mechanism members and to constrictingly engage said mechanism members, each of the end portions being oscillatable with the mechanism members engaged thereby, the end portions being joined by an intermediate portion having a wall increasing in thickness from the end portion of larger diameter toward the end portion of smaller diameter.

OSCAR U. ZERK.